(12) United States Patent
Xie

(10) Patent No.: US 12,742,690 B2
(45) Date of Patent: Sep. 22, 2026

(54) SELF-POWERED THERMAL PROBE FOR COOKING

(71) Applicant: Boxin Xie, Shenzhen (CN)

(72) Inventor: Boxin Xie, Shenzhen (CN)

( * ) Notice: Subject to any disclaimer, the term of this patent is extended or adjusted under 35 U.S.C. 154(b) by 287 days.

(21) Appl. No.: 18/429,636

(22) Filed: Feb. 1, 2024

(65) Prior Publication Data

US 2024/0167892 A1 May 23, 2024

(51) Int. Cl.
*G01K 7/22* (2006.01)

(52) U.S. Cl.
CPC ........... *G01K 7/22* (2013.01); *G01K 2215/00* (2013.01)

(58) Field of Classification Search
None
See application file for complete search history.

(56) References Cited

U.S. PATENT DOCUMENTS 11,767,932 B1 * 9/2023 Massie ...................... F16L 3/12 248/74.1
2013/0019353 A1 1/2013 Liu et al.
2015/0013957 A1 1/2015 Van Dijk
2016/0377490 A1 * 12/2016 Nivala ..................... G01K 7/42 374/155
2018/0180644 A1 6/2018 Marnani et al.
2022/0344560 A1 * 10/2022 Zhao ........................ G01K 1/08

* cited by examiner

*Primary Examiner* — Erica S Lin
(74) *Attorney, Agent, or Firm* — Hemisphere Law, PLLC

(57) ABSTRACT

A self-powered thermal probe for cooking comprises a fixing cover, a mounting shell, a probe tube, a first heat conducting block, a temperature-difference power generation piece, a second heat conducting block, a PCB, a temperature sensor and a battery. One end of the mounting shell is connected to the fixing cover, and the other end of the mounting shell is connected to the probe tube. The first heat conducting block and the second heat conducting block are respectively arranged on a hot surface and a cold surface of the temperature-difference power generation piece. The temperature-difference power generation piece, the temperature sensor and the battery are all electrically connected to the PCB.

12 Claims, 5 Drawing Sheets

SELF-POWERED THERMAL PROBE FOR COOKING

BACKGROUND OF THE INVENTION

Technical Field

The disclosure relates to a self-powered thermal probe for cooking.

Description of Related Art

The statement here merely aims to provide background information related to the invention and does not necessarily constitute the prior art.

Thermal probes for cooking, also referred to as probe-type temperature gauges, are inserted into food, placed on barbeque grills, or used in other application scenarios to detect the temperature during the cooking process to determine the cooking degree of food according to the temperature, so as to prevent the food from being cooked insufficiently or excessively and eliminate to the maximum extent health and safety hazards caused by insufficient or excessive cooking of food. However, existing thermal probes for cooking generally use a disposable battery or a battery charged by a charging case as a power supply. In a case where the disposable battery is used, the battery needs to be replaced frequently, leading to a waste of resources and a high use cost. In a case where the battery charged by a charging case is used, a rechargeable effect is realized, the charging box must be used to charge the battery, and a self-powered function cannot be realized, leading to some limitations in use.

The inventor realizes that there is not yet a self-powered thermal probe for cooking at present.

BRIEF SUMMARY OF THE INVENTION

In view of this, the invention adopts the following technical solution:

A self-powered thermal probe for cooking comprises a fixing cover, a mounting shell, a probe tube, a first heat conducting block, a temperature-difference power generation piece, a second heat conducting block, a PCB, a temperature sensor and a battery, wherein the mounting shell has an end connected to the fixing cover and an end connected to the probe tube;

the first heat conducting block, the temperature-difference power generation piece and the second heat conducting block are all arranged in the mounting shell, and the PCB is received in the probe tube and partially extends into the mounting shell;

the first heat conducting block and the second heat conducting block are respectively arranged on a hot surface and a cold surface of the temperature-difference power generation piece, the PCB located in the mounting shell is arranged between the temperature-difference power generation piece and the second heat conducting block, and the temperature-difference power generation piece, the temperature sensor and the battery are all electrically connected to the PCB.

In some embodiments, the temperature-difference power generation piece is a ceramic power generation piece or a semiconductor power generation piece.

In some embodiments, the first heat conducting block and the second heating conducting block are metal parts.

In some embodiments, the probe tube is a stainless steel part.

In some embodiments, the fixing cover is an electrically conductive metal screw, and the mounting shell is a plastic part.

In some embodiments, the temperature sensor is an NTC temperature sensing element, and the battery is farad capacitor or a lithium battery.

In some embodiments, the self-powered thermal probe for cooking further comprises fixing elastic pieces for fixing the PCB, the number of the fixing elastic pieces is two, and the two fixing elastic pieces are symmetrically arranged on two sides of the PCB.

In some embodiments, the fixing elastic pieces are made from an elastically conductive metal material.

In some embodiments, each fixing elastic piece comprises a fixing end, an inclined bent end and an abutting end which are formed integrally, and the fixing end is connected to the abutting end through the inclined bent end and is connected to the PCB.

In some embodiments, the inclined bent end is an acute bent end.

In some embodiments, the self-powered thermal probe for cooking further comprises a contact pin, a pin mounting notch is arranged between the second heat conducting block and the fixing cover, the contact pin is arranged in the pin mounting notch, and the PCB and the fixing cover are connected through the contact pin.

In some embodiments, the temperature sensor is arranged close to a front end of the PCB, and the fixing elastic pieces are located between the temperature sensor and the battery.

In some embodiments, the self-powered thermal probe for cooking further comprises a silicone sealing ring, a probe tube flange is arranged at an end, close to the mounting shell, of the probe tube, and the silicone sealing ring is arranged on a side, close to the probe tube, of the probe tube flange.

In some embodiments, an extension end is arranged at an end, close to the probe tube, of the second heat conducting block and located in the probe tube.

Compared with the prior art, the invention has the following beneficial effects: the first heat conducting block and second heat conducting block are respectively arranged on the hot surface and the cold surface of the temperature-difference power generation piece 5 to generate electric energy, and the electric energy is then stored in the battery to be used, making the thermal probe for cooking self-powered; moreover, the self-powered thermal probe for cooking is reasonable and efficient in overall structure and easy to implement, the user-friendly design degree and intelligent level of the thermal probe are effectively improved, and limitations of the thermal probe in use are effectively reduced.

REFERENCE SIGNS

Figure 1:
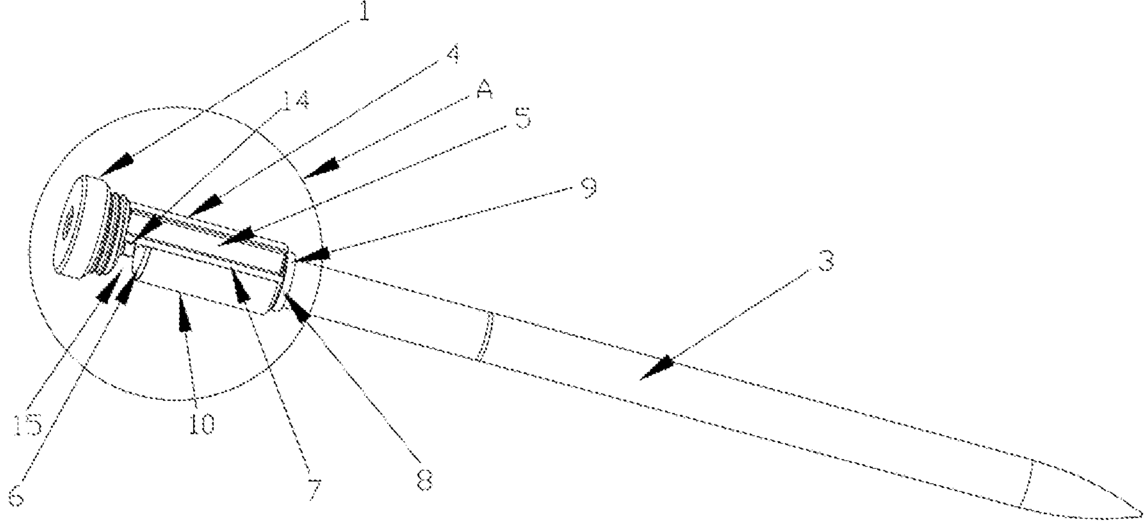
FIG. 1 is a structural view without a mounting shell according to one embodiment of the invention.

1, fixing cover; 2, mounting shell; 3, probe tube; 4, first heat conducting block; 5, temperature-difference power generation piece; 6, second heat conducting block; 601, extension end; 7, PCB; 8, probe tube flange; 9, silicone sealing ring; 10, nano-heat insulation layer; 11, temperature sensor; 12, fixing elastic piece; 121, fixing end; 122, inclined bent end; 123, abutting end; 13, battery; 14, contact pin; 15, pin mounting notch.

DETAILED DESCRIPTION OF THE INVENTION

In the description of the invention, directional descriptions, if any, such as "upper", "lower", "front", "back", "left" and "right" are used to indicate directional or positional relationships based on the accompanying drawings merely for the purpose of facilitating and simplifying the description of the invention, do not indicate or imply that devices or elements refereed to must be in a specific direction or be configured and operated in a specific direction, and thus should not be construed as limitations of the invention. If one technical feature is referred to as being "arranged on", "fixed to", "connected to" or "mounted on" the other technical feature, it may be directly arranged on, fixed to, connected to or mounted on the other technical feature, or indirectly arranged on, fixed to, connected to, or mounted on the other technical feature.

In the description of the invention, "a plurality of", if any, means one or more; "multiple', if any, refers to two or more; "greater than", "less than" and "exceed", if any, all should be construed as not including the number involved; "over", "below" and "within", if any, should be construed as including the number involved. Terms such as "first" and "second", if any, are merely used for distinguishing the names of identical or similar technical features, and do not imply/indicate the relative importance of the technical features, the number of the technical features and the precedence relationship of the technical features.

Preferred embodiments of the invention will be described in further detail below in conjunction with accompanying drawings.

As shown in FIG. 1-FIG. 5, this embodiment provides a self-powered thermal probe for cooking, comprising a fixing cover 1, a mounting shell 2, a probe tube 3, a first heat conducting block 4, a temperature-difference power generation piece 5, a second heat conducting block 6, a PCB 7, a temperature sensor 11 and a battery 13, wherein one end of the mounting shell 2 is connected to the fixing cover 1, and the other end of the mounting shell 2 is connected to the probe tube 3.

The first heat conducting block 4, the temperature-difference power generation piece 5 and the second heat conducting block 6 are all arranged in the mounting shell 2, and the PCB 7 is received in the probe tube 3 and partially extends into the mounting shell 2.

The temperature-difference power generation piece 5 may be a ceramic power generation piece, or other semiconductor power generation pieces such as a silicon power generation piece. The first heat conducting block 4 and the second heat conducting block 6 are respectively arranged on a hot surface and a cold surface of the temperature-difference power generation piece 5 respectively. The PCB 7 located in the mounting shell 2 is arranged between the temperature-difference power generation piece 5 and the second heat conducting block 6. The temperature-difference power generation piece 5 is electrically connected to the PCB 7.

The probe tube 3 is generally an alloy part, preferably a stainless steel part (such as a 304 stainless steel part), and has the advantages of being anti-rust, anti-oxidation, safer, healthier, and the like.

The battery 13 is arranged at an end, away from the mounting shell 2, of the PCB 7 and electrically connected to the PCB 7, and the temperature sensor 11 is arranged in the probe tube 3 and electrically connected to the PCB 7.

In this embodiment, the first heat conducting block 4 and the second heat conducting block 6 are generally made from a metal material. In this way, a high temperature can be transferred from the outside to the hot surface of the temperature-difference power generation piece 5 by the first heat conducting block 4, and then the temperature-difference power generation piece 5 converts a temperature difference into electric energy, which is stored in the battery 13. One end of the PCB 7 is arranged close to the cold surface of the temperature-difference power generation piece 5 to prevent high-temperature damage to the PCB 7, thus guaranteeing the working stability of the PCB 7. The self-powered thermal probe for cooking is reasonable and efficient in overall structure and easy to implement, the user-friendly design degree and intelligent level of the thermal probe are effectively improved, and limitations of the thermal probe in use are effectively reduced.

In this embodiment, the fixing cover 1 is preferably a stainless steel fixing screw or an electrically conductive metal screw and used for fixing the mounting shell 2. In some scenarios, the fixing cover 1 may be used as a positive pole for charging the battery 13.

The mounting shell 2 is generally a plastic part, so the thermal probe can be pinched up easily in use, hand scalds caused by metal are avoided, and the influence of the configuration of an all-metal thermal probe on the performance of a contact pin 14 described below is also avoided.

The temperature sensor 11 may be an NTC temperature sensing element or other temperature sensing elements. The battery 13 may be a farad capacitor (preferably a super farad capacitor) or a lithium battery (a rechargeable lithium battery). Of course, the battery 13 may also be other batteries on the market (such as lead-acid batteries or carbon batteries).

Figure 4:
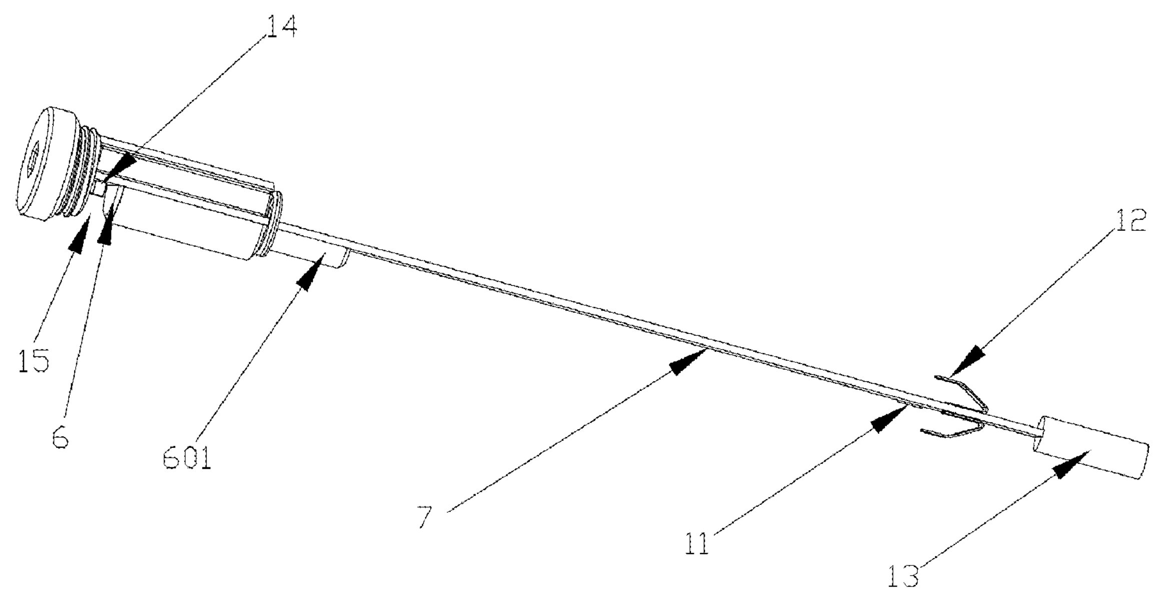
FIG. 4 is a structural view without a mounting shell and a probe tube according to one embodiment of the invention.

As shown in FIG. 4, in this embodiment, the self-powered thermal probe for cooking further comprises fixing elastic pieces 12 for fixing the PCB 7, the PCB 7 is elastically connected to the probe tube 3 through the fixing elastic pieces 12, and the fixing elastic pieces 12 are preferably metal elastic pieces with good electrical conductivity and heat conductivity, such that the probe tube 3 can be connected to the PCB 7 as a negative pole of a circuit. Further, in this embodiment, the number of the fixing elastic pieces 12 is two, and the two fixing elastic pieces 12 are symmetrically arranged on two sides of the PCB 7 to ensure that the PCB 7 can always be fixed to the middle of the probe tube 3 steadily; and such a connection method can fulfill to some extent an elastic buffer effect to prevent the PCB 7 from being damaged to the maximum extent even when the thermal probe is collided or falls off, thus effectively guaranteeing the service life and stability of the thermal probe.

Figure 5:
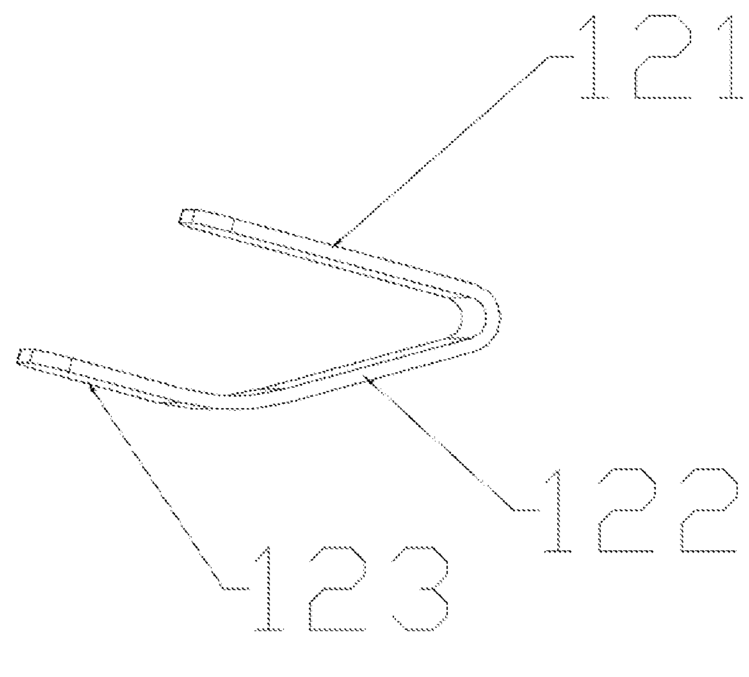
FIG. 5 is a structural view of a fixing elastic piece according to one embodiment of the invention.

Preferably, as shown in FIG. 5, in this embodiment, the fixing elastic piece 12 comprises a fixing end 121, an inclined bent end 122 and an abutting end 123 which are formed integrally, wherein the fixing end 121 is connected to the abutting end 123 through the inclined bent end 122 and is connected to the PCB 7, for example, in a fixed manner by welding; the inclined bent end 122 is preferably an acute bent end, such that a better elastic buffer effect can be provided by small-angle bending and the space occupied is reduced; and the abutting end 123 is connected to the probe tube 3, such that the PCB 7 and the probe tube 3 are elastically connected and fixed.

Figure 2:
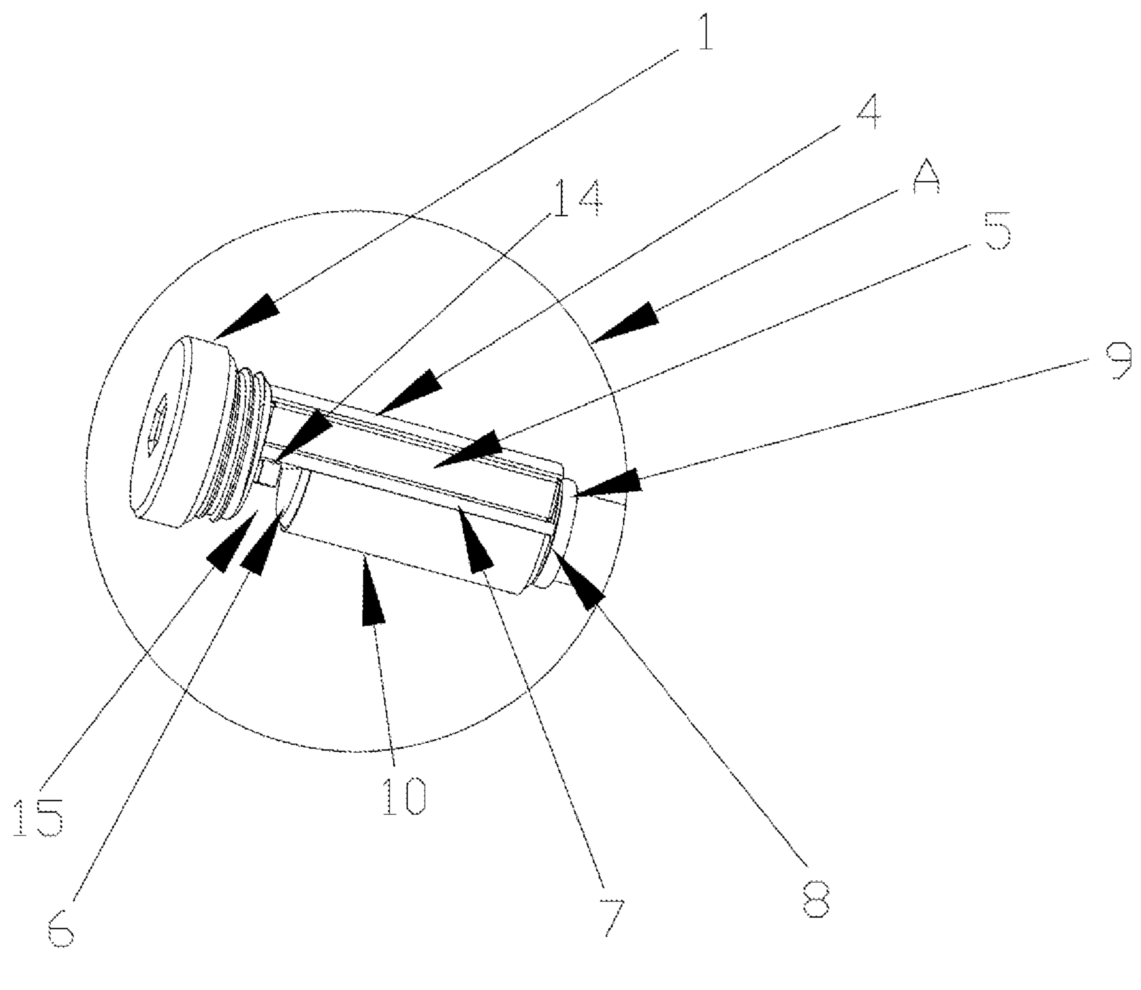
FIG. 2 is an enlarged structural view of part A in FIG. 1.
Figure 3:
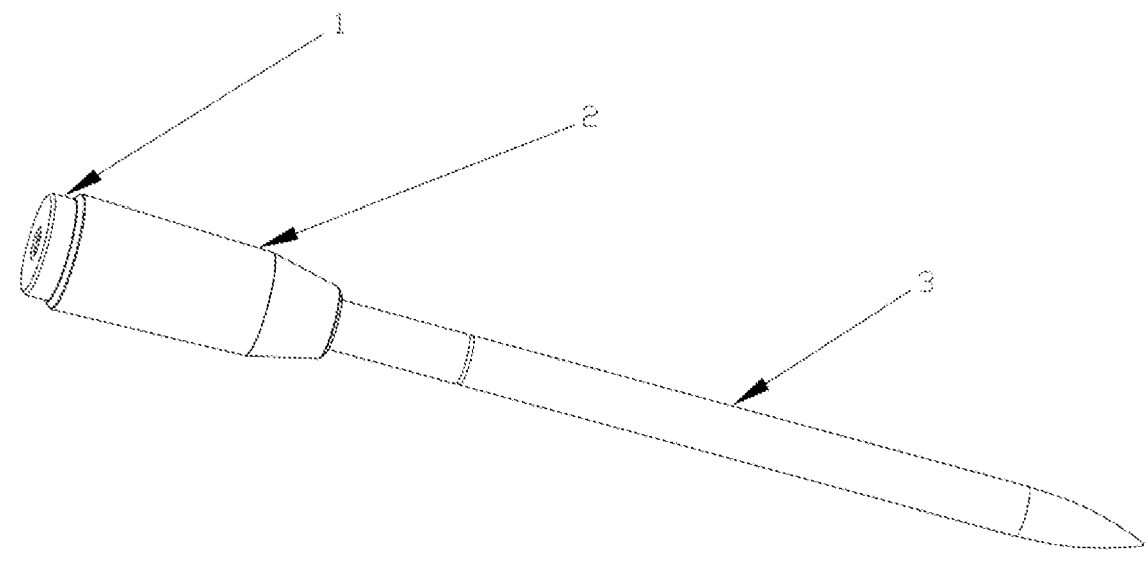
FIG. 3 is a structural view according to one embodiment of the invention.

As shown in FIG. 1, FIG. 2 and FIG. 4, in this embodiment, the self-powered thermal probe for cooking further comprises a contact pin 14, a pin mounting notch 15 is arranged between the second heat conducting block 6 and the fixing cover 1, the contact pin 14 is arranged in the pin mounting notch 15, and the PCB 7 is elastically connected to the fixing cover 1 through the contact pin 14. In this way, a signal from the PCB 7 can be transmitted to the fixing cover 1 through the contact pin 14, and the contact pin 14 can be better protected by the pin mounting notch 15 between the fixing cover 1 and the second heating conducting block 6. In this embodiment, the fixing cover 1 may be preferably used as a positive pole and/or antenna for charging. Of course, in actual application, this design can be adjusted and amended as actually needed.

As shown in FIG. 4, the temperature sensor 11 is arranged close to a front end of the PCB 7, that is to say, a temperature sensing area of the thermal probe for cooking is located at a front end of the thermal probe, which can better facilitate temperature detection to satisfy temperature detection requirements of food with different thicknesses.

Further, the fixing elastic pieces 12 are arranged between the temperature sensor 11 and the battery 13 to isolate to some extent the temperature sensor 11 from the battery 13, thus reducing the influence of the battery 13 on the temperature detection process and improving the temperature detection accuracy.

As shown in FIG. 1 and FIG. 2, in this embodiment, the self-powered thermal probe for cooking further comprises a silicone sealing ring 9, a probe tube flange 8 is arranged at an end, close to the mounting shell 2, of the probe tube 3, and the silicone sealing ring 9 is arranged on a side, close to the probe tube 3, of the probe tube flange 8 to fulfill a better sealing effect. In this embodiment, a nano-heat insulation layer 10 is arranged on an outer side of the second heating conducting block 6 to effectively prevent a high temperature from being directly transferred to the second heat conducting block 6 from the outside, thus further guaranteeing the reliability of the power generation function of the temperature-difference power generation piece 5.

As shown in FIG. 4, in this embodiment, an extension end 601 is arranged at an end, close to the probe tube 3, of the second heat conducting block 6. The design of the extension end 601 can enlarge the heat conduction area on one hand and on the other hand, can enhance the connection and fixation between the second heat conducting block 6 and the PCB 7, thus making the overall structure more stable and reliable.

The key design point of the invention is that the first heat conducting block and the second heat conducting block are respectively arranged on the hot surface and the cold surface of the temperature-difference power generation piece 5 to generate electric energy, and the electric energy is then stored in the battery to be used, thus making the thermal probe for cooking self-powered; moreover, the self-powered thermal probe for cooking is reasonable and efficient in overall structure and easy to implement, the user-friendly design degree and intelligent level of the thermal probe are effectively improved, and limitations of the thermal probe in use are effectively reduced.

The above specific embodiments are preferred ones of the invention and are not intended to limit the specific implementation scope of the invention. The scope of the invention is not limited to the above specific embodiments. All equivalent changes made according to the shape and structure of the invention should also fall within the protection scope of the invention.

What is claimed is:

1. A self-powered thermal probe for cooking, comprising a fixing cover, a mounting shell, a probe tube, a first heat conducting block, a temperature-difference power generation piece, a second heat conducting block, a PCB, a temperature sensor and a battery, wherein the mounting shell has an end connected to the fixing cover and an end connected to the probe tube;

the first heat conducting block, the temperature-difference power generation piece and the second heat conducting block are all arranged in the mounting shell, and the PCB is received in the probe tube and partially extends into the mounting shell;

the first heat conducting block and the second heat conducting block are respectively arranged on a hot surface and a cold surface of the temperature-difference power generation piece, the PCB located in the mounting shell is arranged between the temperature-difference power generation piece and the second heat conducting block, and the temperature-difference power generation piece, the temperature sensor and the battery are all electrically connected to the PCB, further comprising fixing elastic pieces for fixing the PCB, wherein the number of the fixing elastic pieces is two, and the two fixing elastic pieces are symmetrically arranged on two sides of the PCB, each said fixing elastic piece comprises a fixing end, an inclined bent end and an abutting end which are formed integrally, and the fixing end is connected to the abutting end through the inclined bent end and is connected to the PCB.

2. The thermal probe for cooking according to claim 1, wherein the temperature-difference power generation piece is a ceramic power generation piece or a semiconductor power generation piece.

3. The thermal probe for cooking according to claim 2, wherein the first heat conducting block and the second heating conducting block are metal parts.

4. The thermal probe for cooking according to claim 3, wherein the probe tube is a stainless steel part.

5. The thermal probe for cooking according to claim 4, wherein the fixing cover is an electrically conductive metal screw, and the mounting shell is a plastic part.

6. The thermal probe for cooking according to claim 5, wherein the temperature sensor is an NTC temperature sensing element, and the battery is farad capacitor or a lithium battery.

7. The thermal probe for cooking according to claim 1, wherein the fixing elastic pieces are made from an elastically conductive metal material.

8. The thermal probe for cooking according to claim 1, wherein the inclined bent end is an acute bent end.

9. The thermal probe for cooking according to claim 8, further comprising a contact pin, wherein a pin mounting notch is arranged between the second heat conducting block and the fixing cover, the contact pin is arranged in the pin mounting notch, and the PCB and the fixing cover are connected through the contact pin.

10. The thermal probe for cooking according to claim 9, wherein the temperature sensor is arranged close to a front end of the PCB, and the fixing elastic pieces are located between the temperature sensor and the battery.

11. The thermal probe for cooking according to claim 10, further comprising a silicone sealing ring, wherein a probe tube flange is arranged at an end, close to the mounting shell, of the probe tube, and the silicone sealing ring is arranged on a side, close to the probe tube, of the probe tube flange.

12. The thermal probe for cooking according to claim 11, wherein an extension end is arranged at an end, close to the probe tube, of the second heat conducting block and located in the probe tube.

* * * * *